No. 704,538. Patented July 15, 1902.
A. HARMON.
CULTIVATOR.
(Application filed July 9, 1900.)
(No Model.)
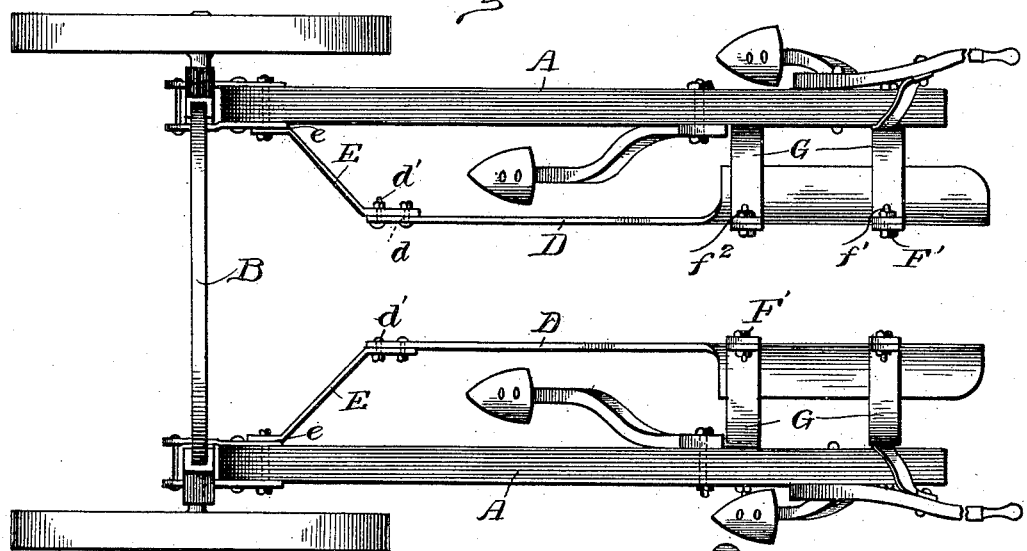
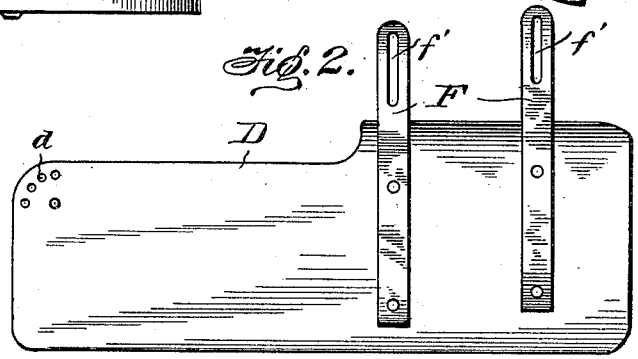
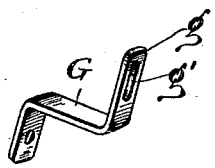
Inventor
Alonzo Harmon
Witnesses
Fenton S. Pelt.
By Soule & Co.
Attorneys

UNITED STATES PATENT OFFICE.

ALONZO HARMON, OF TECUMSEH, NEBRASKA.

CULTIVATOR.

SPECIFICATION forming part of Letters Patent No. 704,538, dated July 15, 1902.

Application filed July 9, 1900. Serial No. 22,949. (No model.)

*To all whom it may concern:*

Be it known that I, ALONZO HARMON, a citizen of the United States, residing at Tecumseh, in the county of Johnson and State of Nebraska, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to cultivators; and it relates particularly to attachments for cultivators for use in connection with growing corn and other young growth.

The object of the invention is to provide a cultivator having attached thereto simple means for effectively preventing injury to corn and the like during working of the soil in which the plants are growing, which will prevent injury to the plants as the cultivator is moved along rows of stalks by moving the leaves of the plants away from the shoes and other parts of the cultivator, thus avoiding injury to the plants and facilitating rapid work.

With this object in view the invention consists of a cultivator having attached thereto a fender or fenders of novel construction and attached to the beam of the cultivator by means facilitating adjustment to adapt the fender for preventing contact of cornstalks and other growth of varying heights with the shovels and other parts of the cultivator.

The invention is illustrated in the accompanying drawings, in which—

Figure 1 is a plan view of the cultivator having my attachment applied thereto. Fig. 2 is a side view of one of my fenders removed from a cultivator, and Fig. 3 represents one of the brackets for attaching the rear end of the fender to the cultivator-beam.

In the drawings, A represents a cultivator-beam. In the present embodiment of my invention I have shown two beams attached at their forward ends by pivot-joints to an axle B, the arrangement being such as to permit one beam and the attached cultivator-shoes C to pass on each side of a row of corn or other plant.

The fender is designated by the letter D, and it consists of a plate, preferably of metal, adapted to extend along the cultivator-beams a short distance from the latter and between the beam and a row of corn or other growing plant. The forward end of the fender D is provided with a series of openings $d$, receiving a bolt $d'$, by which the forward end of the fender is attached to a support E, by which the fender is maintained in position in use.

The support E is attached at its forward end at a point $e$ to the beam A and from this point extends outward and rearward from the beam to the point of attachment to the fender. The rear end of the support E has an opening in it receiving a bolt $d'$, which also extends through one of the openings $d$ in the forward end of the fender.

The rear end of each fender has attached to it upright extensions having in the upper ends thereof elongated slots $f'$, which receive bolts $f^2$, by which the rear ends of the fenders are supported. The extensions F are connected with the beams of the cultivator by brackets G, having vertical outer ends $g$, provided with slots $g'$, corresponding to the slots in the extensions F. Bolts F', having suitable nuts thereon, pass through the slots both in the brackets and in the extensions, as shown in the drawings.

In the use of the fender it will be seen that a cultivator provided with the fender may be moved rapidly along rows of vegetables and plants to soften the ground about the roots thereof without danger of contact with the cultivator-shoes or with other parts of the cultivator. The bracket E, by which the forward end of the fender is supported, first comes into contact with any growing plant, and as it extends rearward and outward from the beam of the cultivator it will guide the plants, &c., away from the beam and into contact with the fender, which latter will prevent contact of the plants with the cultivator.

The fender may be adjusted to different heights, adapting it for use on vegetable growth of different sizes, first by the adjustment permitted by the slotted brackets G and extensions F and by turning the support E upon the point of attachment to the beam of the cultivator and by arranging the bolt $d'$ in a suitable opening $d$ in the forward end of the fender. The openings $d$ are arranged not only at different heights in the fender, but are arranged in a curved line in order to receive the bolt $d'$ in the outer end of the support E no matter what position the support may be moved to to secure the forward end of the fender at different heights.

Having thus described my invention, what I claim as new, and desire to secure by Letters Patent, is—

The combination with a cultivator of a fender extending along the side of the cultivator and adapted to be interposed in use between the cultivator and growing plants, the fender having in its front portion a series of openings in different vertical planes, and having at its rear end an upward extension provided with elongated openings, a rigid support extending rearward and outward from the front of the beam of the cultivator and having in its rear end an opening receiving a bolt which also passes through one of the openings in the front portion of the fender, and a bracket attached to the beam of the cultivator adjacent to the extension from the fender, the bracket having a vertical portion provided with openings adapted to register with those in the extension from the fender, substantially as described.

In testimony whereof I affix my signature in presence of witnesses.

ALONZO HARMON.

Witnesses:
L. C. CHAPMAN,
E. L. BALL,
C. E. CUNIAN.